US007353967B2

(12) United States Patent
Hamm

(10) Patent No.: US 7,353,967 B2
(45) Date of Patent: Apr. 8, 2008

(54) CONTAINER, IN PARTICULAR, INNER PALLET CONTAINER

(75) Inventor: André Hamm, Drulingen (FR)

(73) Assignee: Daviplast-Servicos de Consultoria, Sociedade Unipessoal LDA, Funchal Madeira (PT)

( * ) Notice: Subject to any disclaimer, the term of this patent is extended or adjusted under 35 U.S.C. 154(b) by 872 days.

(21) Appl. No.: 10/310,079

(22) Filed: Dec. 4, 2002

(65) Prior Publication Data

US 2003/0111465 A1 Jun. 19, 2003

(30) Foreign Application Priority Data

Dec. 13, 2001 (DE) ................................ 101 61 416

(51) Int. Cl.
*B65D 25/14* (2006.01)
*B65D 85/00* (2006.01)
*H02G 3/08* (2006.01)

(52) U.S. Cl. ................... 220/495.01; 220/3.2; 206/215

(58) Field of Classification Search ........... 220/495.01, 220/3.2; 206/215
See application file for complete search history.

(56) References Cited

U.S. PATENT DOCUMENTS

| | | | | |
|---|---|---|---|---|
| 4,540,191 | A * | 9/1985 | Hoch | 280/834 |
| 4,819,837 | A * | 4/1989 | Goforth | 222/402.1 |
| 4,858,061 | A * | 8/1989 | Hethcoat | 361/215 |
| 5,514,299 | A * | 5/1996 | Kalwara | 252/511 |
| 5,898,560 | A * | 4/1999 | Flaynik et al. | 361/215 |
| 6,127,934 | A * | 10/2000 | Powell et al. | 340/649 |
| 6,283,320 | B1 * | 9/2001 | Patch | 220/88.1 |
| 7,042,695 | B2 * | 5/2006 | Przytulla et al. | 361/215 |
| 7,066,498 | B2 * | 6/2006 | Kertesz | 285/288.1 |
| 2004/0051305 | A1 * | 3/2004 | Kertesz | 285/21.1 |
| 2004/0101383 | A1 * | 5/2004 | Carr et al. | |
| 2005/0082076 | A1 * | 4/2005 | Przytulla et al. | 174/50 |
| 2006/0081304 | A1 * | 4/2006 | Franks | 141/65 |
| 2006/0197241 | A1 * | 9/2006 | Kertesz | 285/285.1 |

* cited by examiner

*Primary Examiner*—Nathan J. Newhouse
*Assistant Examiner*—Shawn M. Braden
(74) *Attorney, Agent, or Firm*—Notaro & Michalos P.C.

(57) ABSTRACT

A pallet container has a container wall having an outlet opening and a drainage fixture with a flange. The drainage fixture is connected to the outlet opening in the container wall and fastened by the flange to the container wall. A conductor element is provided to discharge electrical charges from the container. At least one part of the conductor element is arranged between the flange and the container wall.

18 Claims, 4 Drawing Sheets

CONTAINER, IN PARTICULAR, INNER PALLET CONTAINER

BACKGROUND OF THE INVENTION

1. Field of the Invention

The invention relates to a container, in particular, an inner pallet container, comprising a drainage fixture, connected to an outlet opening in the container wall and fastened by a flange to the container wall, as well as a conductor element for discharging electrical charges from the container.

2. Description of the Related Art

Containers are known whose conductor element extends through the plastic wall of the container or through a pipe section of the drainage fixture and projects into the container.

SUMMARY OF THE INVENTION

It is an object of the present invention to improve the arrangement of such conductor elements within the container.

In accordance with the present invention, this is achieved in that the conductor element comprises at least one part which is arranged between the flange and the container wall.

Advantageously, this solution provides the possibility of arranging a discharging conductor element on the container without the need for additional openings in the container wall or the drainage fixture.

In a preferred embodiment of the invention, the conductor element is comprised of plastic material in which an electrically conducting material, preferably carbon, is embedded. Such a material, in contrast to metals, withstands aggressive liquids, for example, acids stored in the container.

While it is conceivable to laterally extend the conductor element from its embedded position between flange and container wall, according to a preferred embodiment of the invention the flange has an opening through which a connection to the conductor element can be realized and which can be easily sealed. Through this opening, a threaded member (screw) electrically connected to the conductor element can be extended on which by means of one or several nuts a clamp-type terminal of a conductive discharge cable can be fastened. Preferably, the opening is sealed by an annular seal surrounding the threaded pin. Since the threaded member can be sealed relative to the outlet opening of the container, it does not come into contact with an aggressive liquid stored within the container and can be comprised of metal. The threaded member can be in the form of a screw having a head which can be countersunk in the conductor element so as to prevent rotation.

In a preferred embodiment of the invention, the part of the conductor element is completely enclosed by a welding connection between the flange and the container wall so that the outlet opening is sealed all around.

The connection of flange and container wall can be facilitated in that the flange or/and the container wall is provided with a cutout as a seat for the part which cutout matches the contour of the part of the conductor element. In this way, it can be advantageously prevented that the flange, when connecting it to the container wall, can be deformed by the intermediately positioned conductor element in an undesirable way.

Expediently, means are provided which enable that the conductor element, before connecting flange and container wall, can be plugged onto the drainage fixture. When connecting flange and container wall, the conductor element then maintains precisely the required position relative to the drainage fixture.

In a further advantageous configuration of the invention, the conductor element is flush at least at one edge location of the edge of the outlet opening and/or a drainage opening in an end wall of the pipe section having a transition into the flange.

The conductor element, for example, can comprise a ring whose entire inner edge is flush with the aforementioned opening edges. Instead of a complete ring, it is also possible to employ a ring section, e.g., half a ring.

In a further embodiment of the invention, the conductor element has a projection which projects into a pipe section of the drainage fixture connected to the flange or into the container. Expediently, this projection is radially displaced relative to an opening in an end wall of the pipe section having a transition into the flange. In this situation, the outlet opening can be produced after the connection of flange and container has been completed in that through the pipe section a bore is cut first in the end wall and then in the container wall. In this connection, a part of the intermediately positioned conductor element can be cut away also. In particular, a lost plug connection relative to the part of the end wall for forming the opening can be provided.

According to another embodiment of the invention, a pin-shaped conductor element can be provided which is displaced relative to the outlet opening of the container and is guided through a bore penetrating the flange and the container wall. In this case, the part of the conductor element arranged between the flange and the container wall is very short.

This pin-shaped conductor element can be in the form of a screw which engages with its head behind the container wall and is preferably countersunk within the container wall so as to be secured against rotation.

DESCRIPTION OF THE PREFERRED EMBODIMENTS

Figure 1:
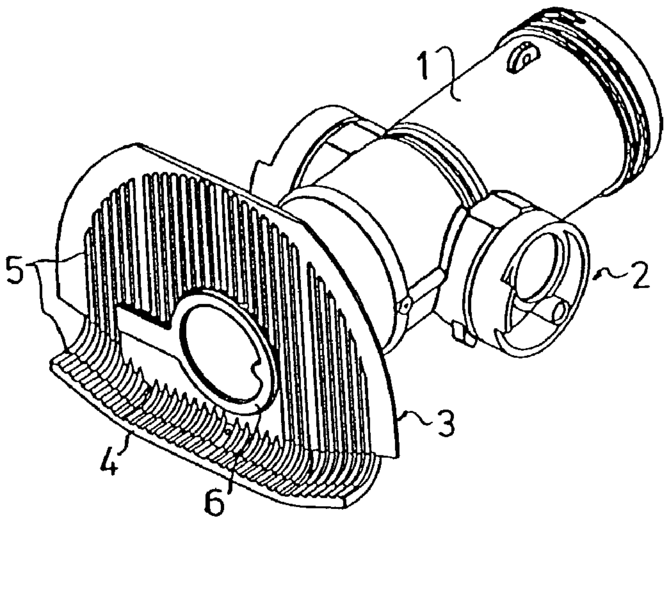
FIG. 1 is a perspective view of a drainage fixture comprising a conductor element, according to a first embodiment of the present intention, for a pallet container.

The drainage fixture made of plastic material illustrated in FIG. 1 has a pipe section 1 in which a valve flap, not illustrated, can be moved by means of a pivot mechanism supported at 2.

Figure 3:
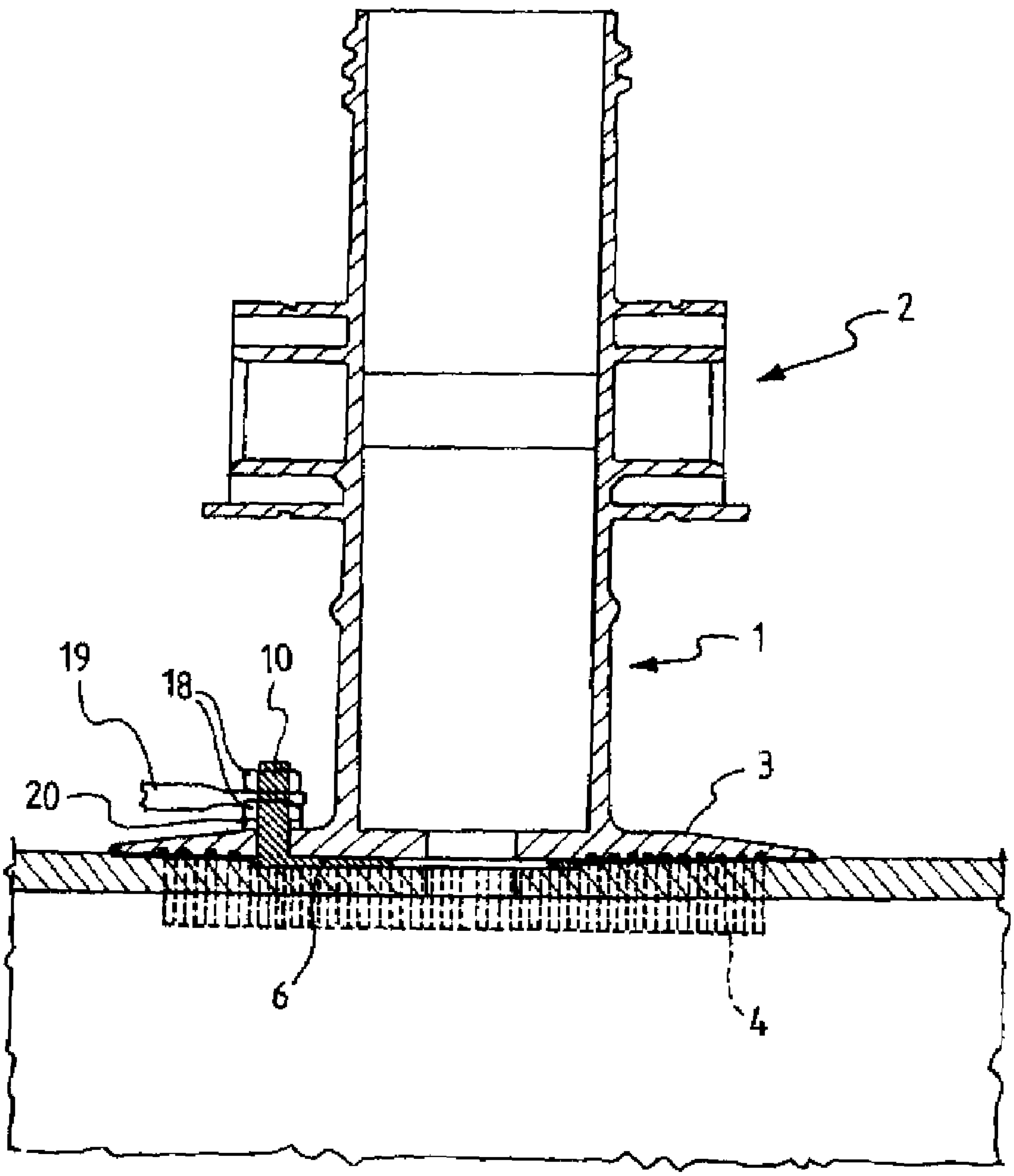
FIG. 3 is a sectional view of the drainage fixture of FIG. 1.

The pipe section 1 is provided at one end with a flange 3 by which the drainage fixture can be welded to the container wall of a plastic container partly shown in FIG. 3, and which is a component of a pallet container. The welding connection or welding seam is located at the lower edge of a container sidewall wherein a bent leg pad 4 of the flange engages a rounded container edge having a transition into the bottom wall. Ribs 5 projecting from the flange 3 facilitate producing this welding connection.

On the flange side of the drainage fixture a conductor element 6 is arranged. The conductor element 6 in the illustrated embodiment is comprised of plastic material, for example, polyethylene, in which carbon powder is embedded in order to provide electrical conductivity.

Figure 2:
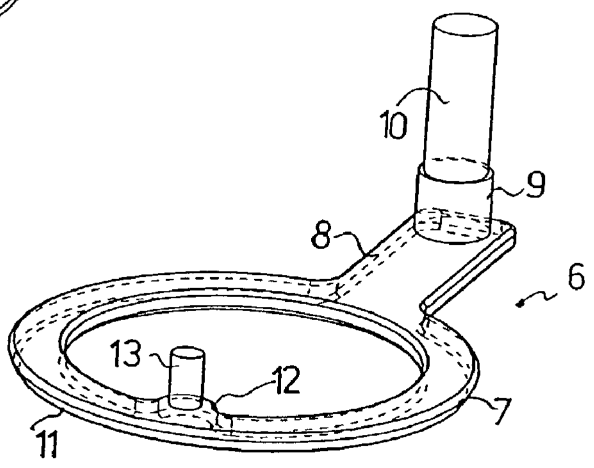
FIG. 2 shows in a perspective illustration the conductor element employed in the drainage fixture of FIG. 1.

As illustrated in particular in FIG. 2, the conductor element 6 comprises an annular member 7 from which a handle-shaped member 8 projects. The handle-shaped member 8 is provided at its free end with a unitary (monolithic) sleeve 9 projecting in the direction of the axis of the annular member 7. The sleeve 9, in turn, is connected to a threaded pin or screw 10. The threaded pin (screw) 10 can be comprised, like the conductor element 6, of plastic material in which a conducting material is embedded. In the illustrated embodiment, the threaded pin 10 is made of metal (metal screw).

Like the annular member 7, the handle-shaped member 8 has at one side a slanted edge 11 which facilitates welding the flange to the container wall.

Diametrically opposed to the handle-shaped member 8 a projection 12 projects from the inner side of the annular member 7, and a pin 13 projects in the direction of the axis of the annular member 7.

Figure 4:
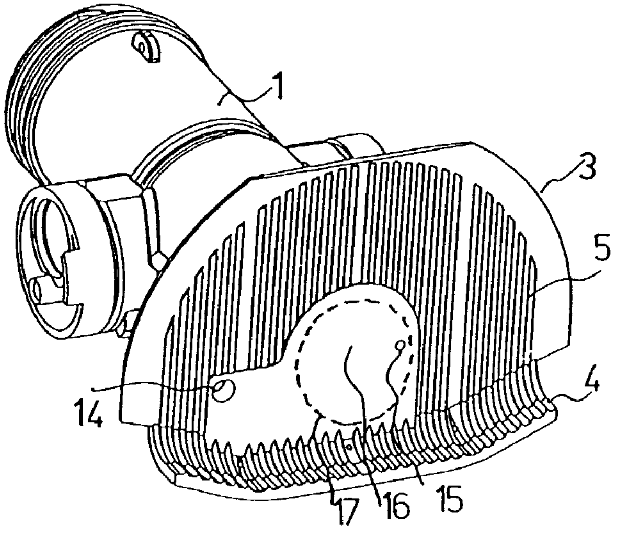
FIG. 4 shows a further perspective view of the drainage fixture of FIG. 1 without the conductor element.

The sleeve 9 engages a plug receptacle (hole) 14 which is arranged on the flange 3 radially displaced relative to the pipe section 1 of the drainage fixture. As illustrated particularly in FIG. 4, the hole 14 is provided in an area without ribs which also has an additional plug receptacle (hole) 15 for receiving the pin 13. The hole 15 is formed in an end wall 16 closing off the pipe section 1. After the flange 3 has been connected to the container wall, a drainage opening can be cut (indicated by a dashed line in FIG. 4) into the end wall 16.

In FIG. 3, the reference numeral 18 identifies nuts threaded onto the screw 10. Between the nuts 18 a clamp-type terminal of a conductive discharge cable 19 is clamped. The reference numeral 20 identifies a sealing ring.

Before welding the drainage fixture to the container, the conductor element 6 is plugged onto the drainage fixture whereby the pins 10, 13 engage the holes 14, 15. The position of the conductor element relative to the drainage fixture is fixed in this way. In place of the plug connections, or in addition thereto, the conductor element could be connected to the drainage fixture by welding or/and gluing.

When the flange 3 is welded to the container wall, a ring-shaped welding connection or welding seam is produced which encloses the conductor element 6 completely. In this way, an effective sealing action is provided relative to the edge of the flange 3. The hole 14 is sealed off by means of the sealing ring 20.

In the state in which the drainage fixture is welded to the container, a bore is cut through the pipe section 1 so as to form the drainage opening 17 wherein adjacent to the end wall 16 the conductor element 6 as well as the container wall are cut through also. A remaining section of the annular member 7 of the conductor element 6 delimits a flow channel formed by cutting the bore and can in this way discharge charges from the liquid in the container. The edges of the drainage opening 17, of the conductor element 6, and of the outlet opening formed in the container wall are flush with one another.

In the following embodiments identical parts or parts functioning in the same way are identified with the same reference numerals as in the preceding embodiment, but the respective reference numerals are supplemented by letters a, b, etc.

Figure 5:
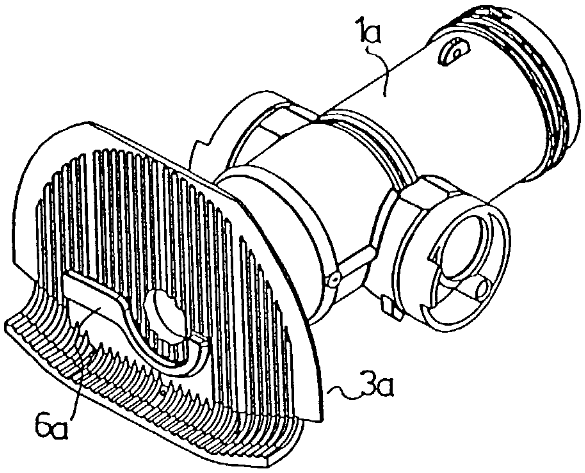
FIG. 5 is a perspective view of a drainage fixture comprising a conductor element according to a second embodiment of the present intention.
Figure 6:
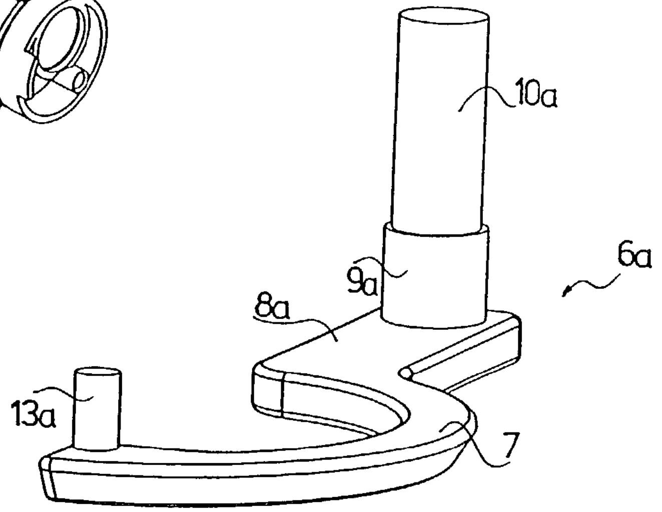
FIG. 6 shows the conductor element employed in the drainage fixture of FIG. 5 in a perspective illustration.

The embodiment of FIGS. 5 and 6 differs from the preceding embodiment in that an annular member 7*a* of a conductor element 6*a* is not in the form of a closed ring but is embodied as a ring section in the form of half a ring. In this embodiment, after welding of the flange 3*a* to the container wall, openings are generated in the end wall and the container wall and a section of the annular member 7*a* is cut away.

Figure 7:
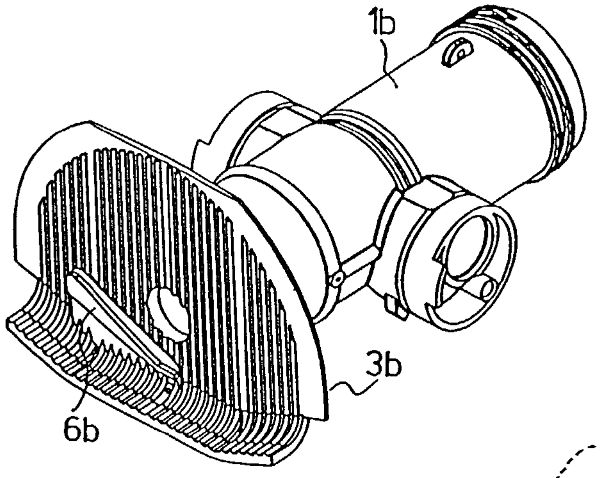
FIG. 7 is a perspective view of a drainage fixture comprising a conductor element according to a third embodiment of the present intention.
Figure 8:
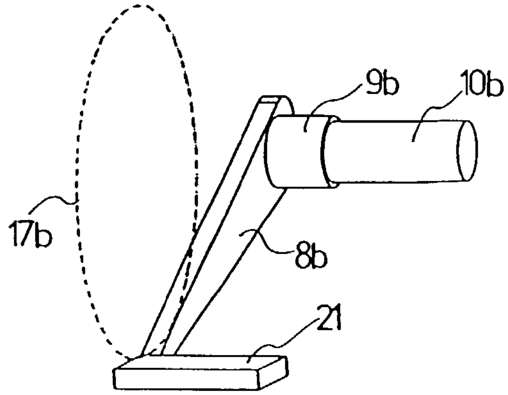
FIG. 8 shows the conductor element employed in the drainage fixture of FIG. 7 in a perspective view.

In the embodiment of FIGS. 7 and 8, a conductor element 6*b* with a handle-shaped member 8*b* is provided from which a projection 21 projects in a direction in which it is parallel to the axis of the drainage opening 17*b* (indicated by a dashed line). The projection 21 is radially displaced relative to the drainage opening 17*b* and extends, by forming a plug connection, through a cutout in an end wall (not cut out) closing off the pipe section 1*b* and having a transition into the flange 3*d*. The drainage opening 17*b* contacts or adjoins the handle-shaped member 8*b* only at one point or a line.

Figure 9:
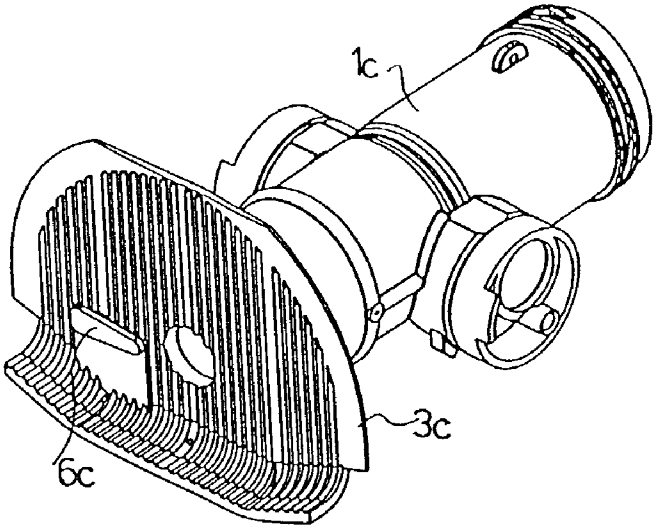
FIG. 9 is a perspective view of a drainage fixture comprising a conductor element according to a fourth embodiment of the present intention.
Figure 10:
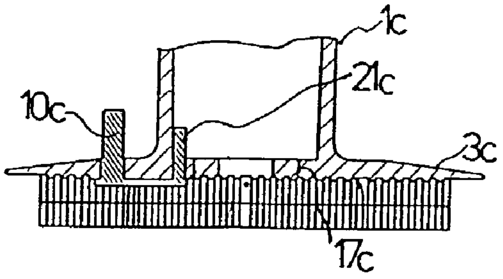
FIG. 10 is a partial sectional view of the drainage fixture of FIG. 9.
Figure 11:
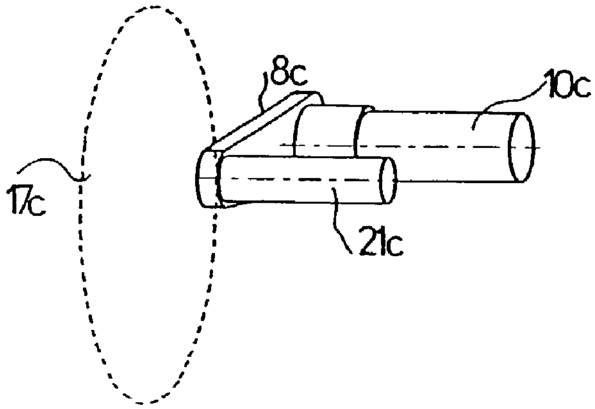
FIG. 11 shows the conductor element employed in the drainage fixture of FIGS. 9 and 10 in a perspective illustration.

In the embodiment of FIGS. 9 through 11, the handle-shaped member 8*c* of the conductor element 6*c* adjoins or contacts the drainage opening 17*c* also only at one point or a line. Radially displaced to the drainage opening 17*c* a projection 21*c* projects from the part 8*c*.

It is understood that the flange must not be connected as a unitary (monolithic) part with the other drainage fixture elements; only a socket is required to which the remaining drainage fixture is connectable, preferably by a screw connection.

While specific embodiments of the invention have been shown and described in detail to illustrate the inventive principles, it will be understood that the invention may be embodied otherwise without departing from such principles.

What is claimed is:

1. A container comprising:

a container wall having an outlet opening;

a drainage fixture comprising a pipe section extending in a longitudinal direction and a flange extending outwardly from an end of the pipe section, in a plane that is transverse to the longitudinal direction, the flange being welded to the container wall along a welding connection;

the drainage fixture connected to the outlet opening in the container wall and fastened by the flange to the container wall;

a conductor element configured to discharge electrical charges from the container;

wherein at least one part of the conductor element is arranged between the flange and the container wall, the at least one part of the conductor element being enclosed by the welding connection; and wherein the conductor element is flush at least at one edge location relative to at least one of an edge of the outlet opening and a drainage opening of an end wall of a pipe section of the drainage fixture, the end wall having a transition into the flange.

2. The container according to claim 1, wherein the conductor element is comprised of plastic material and an electrically conducting material embedded in the plastic material.

3. The container according to claim 2, wherein the electrically conducting material is carbon.

4. The container according to claim 1, wherein the conductor element comprises a projection that projects into the pipe section or into the container.

5. The container according to claim 1, wherein the flange has an opening for producing a connection to the conductor element.

6. The container according to claim 5, wherein the opening is sealed by an annular seal.

7. The container according to claim 5, further comprising a screw electrically connected to the conductor element, wherein the screw extends through the opening of the flange.

8. The container according to claim 7, wherein the screw is a metal screw.

9. The container according to claim 8, wherein the metal screw has a head which engages from behind the conductor element.

10. The container according to claim 9, wherein the metal screw is countersunk in the conductor element and secured against rotation.

11. The container according to claim 1, wherein a cutout matching a contour of the at least one part of the conductor element is formed in at least one of the flange and the container wall.

12. The container according to claim 1, wherein the conductor element is configured to be plugged onto the drainage fixture before the flange and the container wall are connected to one another.

13. The container according to claim 4, wherein the projection is radially displaced relative to a drainage opening of an end wall of a pipe section of the drainage fixture, the end wall having a transition into the flange.

14. The container according to claim 13, wherein a lost plug connection is provided in a portion of the end wall that is configured to be cut out for forming the drainage opening.

15. The container according to claim 1, wherein the conductor element is pin-shaped and extends though a bore penetrating the flange and the container wall.

16. The container according to claim 15, wherein the conductor element is a screw engaging the container wall from behind.

17. The container according to claim 16, wherein the screw is countersunk in the container wall and secured against rotation.

18. The container according to claim 1 in the form of a pallet container.

* * * * *